United States Patent [19]
von Nordenskjöld et al.

[11] Patent Number: 5,472,611
[45] Date of Patent: Dec. 5, 1995

[54] PROCESS AND APPARATUS FOR PURIFICATION OF WASTEWATER

[75] Inventors: Reinhart von Nordenskjöld, Killistrasse 3, Egmating-Münster, Germany, D-85658; Peter Kröner, Münich, Germany

[73] Assignee: Reinhart von Nordenskjöld, Egmating-Münster, Germany

[21] Appl. No.: 146,446

[22] Filed: Oct. 29, 1993

[30] Foreign Application Priority Data

Oct. 30, 1992 [DE] Germany .................... 42 36 791.3

[51] Int. Cl.⁶ ............................................. C02F 3/12
[52] U.S. Cl. .................. 210/624; 210/626; 210/195.3; 210/232; 210/906
[58] Field of Search ................... 210/170, 194, 210/195.1, 195.3, 195.4, 232, 259, 620, 624, 626, 628, 906

[56] References Cited

U.S. PATENT DOCUMENTS

| | | | |
|---|---|---|---|
| 3,355,023 | 11/1967 | Foster | 210/195.4 |
| 3,764,523 | 10/1973 | Stankewich, Jr. | 210/624 |
| 3,770,623 | 11/1973 | Seidel | 210/602 |
| 4,021,156 | 3/1977 | Dubach et al. | 210/626 |
| 4,021,347 | 5/1977 | Teller et al. | 210/195.3 |
| 4,139,457 | 2/1979 | Mackrle et al. | 210/194 |
| 4,224,155 | 9/1980 | Milne | 210/195.3 |
| 4,287,062 | 9/1981 | von Nordenskjöld | 210/199 |
| 4,405,456 | 9/1983 | Kinzer et al. | 210/195.4 |
| 4,793,929 | 12/1988 | Kickuth | 210/605 |
| 4,797,272 | 1/1989 | von Nordenskjöld | 210/628 |
| 4,844,800 | 7/1989 | Brucker | 210/220 |
| 5,011,605 | 4/1991 | Pape et al. | 210/624 |
| 5,078,882 | 1/1992 | Northrop | 210/602 |
| 5,098,572 | 3/1992 | Faup et al. | 210/906 |

FOREIGN PATENT DOCUMENTS

| | | |
|---|---|---|
| 0048630 | 9/1981 | European Pat. Off. . |
| 0237391 | 2/1987 | European Pat. Off. . |
| 0247519 | 5/1987 | European Pat. Off. . |
| 1246598 | 8/1967 | Germany . |
| 2741142 | 4/1979 | Germany . |
| 2857345 | 1/1980 | Germany . |

*Primary Examiner*—Christopher Upton
*Attorney, Agent, or Firm*—Brumbaugh, Graves, Donohue & Raymond

[57] ABSTRACT

The specification discloses a process and apparatus for the purification of wastewater in several successive stages wherein the wastewater is aerated in a first region and is then subjected to intermediate clarification in a second region and including a post-clarification aeration in a third region and post-clarification sedimentation in a fourth region.

In order to provide a simple, space-saving, low-cost yet reliable wastewater treatment arrangement, the apparatus is arranged to include all four regions in one basin by providing separating walls in the basin. These regions can be preceded by other processing stage regions and followed by filtering or storage regions.

In order to allow adjustment for varying loads and for changing relationships between hydraulic and biochemical loads, the separating walls between the regions are arranged to be movable to permit changes in the relative volumes of the regions.

33 Claims, 2 Drawing Sheets

5,472,611

PROCESS AND APPARATUS FOR PURIFICATION OF WASTEWATER

BACKGROUND OF THE INVENTION

This invention relates to processes and apparatus for the purification of wastewater in several sequential phases wherein the wastewater is aerated in a first phase and is then clarified in a second phase, which includes a sludge-return followed by a further aeration phase and a further sedimentation phase.

Such a process and apparatus are disclosed in German Offenlegungsschrift No. 28 57.345. The apparatus disclosed therein includes an activated sludge basin with a sludge-deposition zone and a post-aeration basin, as well as a deposition basin and an accumulation basin. The various basins have an essentially rectangular shape and are connected to each other with appropriate pipelines. The disadvantages of such arrangements are that they occupy a relatively large area, are expensive to build, and require expensive pipeline systems, fixtures and dams for moving wastewater from one basin to the next. Furthermore, the various basin sizes for the individual phases are fixed by the construction and cannot be adjusted after construction for different clarification processes. In addition, the construction requires excessive height differentials since there are head losses from basin to basin.

SUMMARY OF THE INVENTION

Accordingly, it is an object of the present invention to provide a process and apparatus for purification of wastewater which overcome the above-mentioned disadvantages of the prior art.

Another object of the invention is to provide a process and apparatus for wastewater treatment using a construction that is simpler, more economical in space and more favorable in cost, and which, in particular, permits adjustment of the capacity of the installation in accordance with the various process stage loads and clarification steps, primarily by varying the process stage volumes and/or stage surface areas.

These and other objects of the invention are attained by carrying out the steps of aerating the wastewater, providing intermediate clarification, and providing post-clarification aeration and subsequent sedimentation in a single basin.

Moreover, all of these process stages are carried out continuously, i.e., they take place simultaneously in the same basin. This process has the advantage that no expensive pipeline systems, fixtures or dams are required for the purpose of connecting the various process stages to each other. Because of the simple spatial arrangement of the stages in a single basin, space, building costs and operating costs can be saved. Furthermore, this type of construction makes it possible to operate with a minimum of head loss in the passage of wastewater through the basin.

The basin can be an earth basin made by excavating an appropriate basin shape. The basin bottom is covered with sealing webs, such as strips or sheets of a thin-film impervious material.

In the aeration phase, the wastewater is introduced into an activated sludge region of the basin, is aerated with air or oxygen, and is circulated therein so that an aerobic decomposition process can take place.

The wastewater then flows out of the activated sludge region through at least one outlet opening arranged in a first separating wall into a subsequent region in which the water level is lower with respect to the basin bottom, and where it flows at a very slow rate, i.e., the wastewater is in a quiescent state. Consequently, sludge can be deposited from the wastewater on the bottom of this subsequent region, constituting the intermediate clarification region of the basin, and it can then be suctioned off by a sludge remover.

The wastewater can then flow out of the intermediate clarification region into the post-clarification region through outflow openings which are in the upper portion of a second separating wall. The outflow openings are located in the clear-water zone beneath the water surface, thereby assuring not only that few suspended particles flow with the water into the next region, but also that any contaminants which may be floating on the surface of the water are retained by the separating wall for controlled removal.

The wastewater passing into the further post-clarification aerating region is aerated therein and then flows through an opening in the lower portion of a further separating wall into the post-clarification sedimentation region. There, any remaining particles in the wastewater can be deposited on the bottom of the basin and are removed by a sludge remover.

After this clarification, the purified wastewater can, if desired, be passed through further phases including plant and polishing filters, which can also be located in the main processing regions, in order to further improve water quality. It is also possible to provide special pretreatment regions such as a Bio-P (biological phosphorus) region directly ahead of the main processing regions. All of the various regions are specifically separated, not by earth dams or by rigid concrete walls spaced from each other as is common in concrete installations, but rather by structurally light walls which are generally capable of being moved in the lengthwise direction of the basin and which are installed after the construction of the overall basin.

Because the wastewater flows into and out of the basin at opposite ends, a water current necessarily occurs from the inlet end to the outlet end in the basin. This provides the advantage of requiring no spatial separation of the individual purification process stages into several basins, because the separating walls and the water current prevent mixing or backflow of the wastewater among the various processing stage regions.

The areas and volumes of the individual processing stage regions are variable and can be adjusted to satisfy the desired purification process conditions by appropriate modification of the positions and orientations of the separating walls.

One of the advantages of this arrangement is that the dimensions and, particularly, the volumes of specific clarification regions are not predetermined by the basin construction, but rather can be adjusted, even after start-up of the clarification installation, and can thereby provide ideal clarification process conditions in order to match increases or changes in the loads. Thus, for instance, in the case of underutilization, the volume of the activated sludge region in which the aeration phase takes place can be reduced with respect to the volume of the intermediate clarification zone by means of appropriate positioning or orientation of the separating wall in order to, for example, prevent die-off of bacteria in the activated sludge region because of underutilization. In the case of an overload, the activated sludge region can be increased in size in order to raise the capacity of the installation and/or match the demand.

Apparatus for the implementation of the process includes a basin which incorporates all regions required for the purification of the wastewater and wherein the basin is divided into various process stage regions by separating walls with appropriately designed local water-passage points.

In an advantageous embodiment of the apparatus, the following process stage regions are provided in succession in the wastewater flow direction: an activated sludge region, an intermediate clarification region, a post-clarification aeration region and a post-clarification sedimentation region.

In addition, it is also possible to provide, by an appropriate separating wall, one or more preceding Bio-P (biological phosphorus) regions or, also by providing an appropriate separating wall, filters, such as plant and polishing filters, at the outlet end of the basin, which preferably are located after the post-clarification sedimentation region in the region of the clear-water zone and are generally on higher-bottom levels. If two filters, such as, for instance, plant and polishing filters, are used, these are separated from the other processing stages by a further separating wall. This separating wall is arranged to even out the water flow across the width of the basin. In addition to the filter stages, several additional aeration regions can also be housed in the same basin, connected in parallel, ahead of the filter stages, and each of these stages may be preceded by a Bio-P stage.

In an advantageous embodiment, the intermediate clarification region ends in a separating wall that is inclined at a predetermined slope angle, which separating wall includes at least one outflow opening, in its upper region with respect to the basin bottom in order to permit flow of water from the intermediate clarification region into the post-clarification aeration region. The activated sludge zone also ends in a separating wall that is inclined upwardly at a predetermined angle, but in the opposite direction, which separating wall has at least one outflow opening in a lower region with respect to the basin bottom in order to allow flow of water from the activated sludge region into the intermediate clarification region, and the outflow opening is preferably located no more than about 30% of the separating wall height from the basin bottom. In this way, the intermediate clarification region is defined by two separating walls to form a funnel-like shape.

The slopes of these separating walls can be adjusted by jointed supports and, in this way, they can be matched to various clarification conditions.

A further separating wall which separates the post-clarification aeration zone from the post-clarification sedimentation zone has at least one throughflow opening in its lower region which is preferably located no more than about 30% of the submerged wall height from the basin bottom.

In a further advantageous embodiment, at least one of the separating walls is a submerged wall.

The separating walls can be mounted in the basin in a rigidly fixed manner or else can be made movable so as to be adjustable in position in the lengthwise direction of the basin in order to make it possible to change the areas and volumes of the individual regions. By appropriate positioning of the separating walls, the basin can be divided into various desired partial regions in accordance with the particular clarification process and the corresponding load. Moreover, the arrangement of the system is aided by the fact that one can also remove or add aeration chains in building-block fashion and/or can complete or extend them by varying the number of aerators in the chains. Furthermore, the sludge-removal arrangement, which is generally designed as a floating system, is adjustable and can be matched to the depth of the sedimentation region.

The intermediate clarification region and the post-clarification sedimentation region preferably have a horizontal sediment-deposition surface and include a sludge remover. A horizontal sediment-deposition surface has the advantage that no special reinforcement of the basin bottom in the deposition zone is needed and, in particular, that no concrete or similar work is required, which in turn permits a simple earth-basin construction and which furthermore has the advantage that the regions of the individual clarification phases can be located at any position in the entire basin surface.

However, it is also possible to provide a sludge channel in the intermediate clarification region which can also include a thickening zone extending down to and below the remainder of the basin bottom.

The basin bottom can be reinforced in the region of the separating walls. In order to ensure sufficient capacity in the case of heavy loads, two or more basins can be arranged parallel to each other, so that they can both be placed in operation, if need be. In addition to the basin, an additional sludge-settling basin can be provided in which the deposited sludge is stored in order to supply it for agricultural use or to a dehydration process or in order to inoculate the activated sludge region.

At the outlet end of each sedimentation or filter region, a float overflow can be provided through which the purified water is withdrawn and which can be adjusted with respect to its throughflow capacity so that an evenly regulated outflow can be achieved independently of the inflow. In this manner, inflow rate variations can be evened out by buffering the basin surface.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
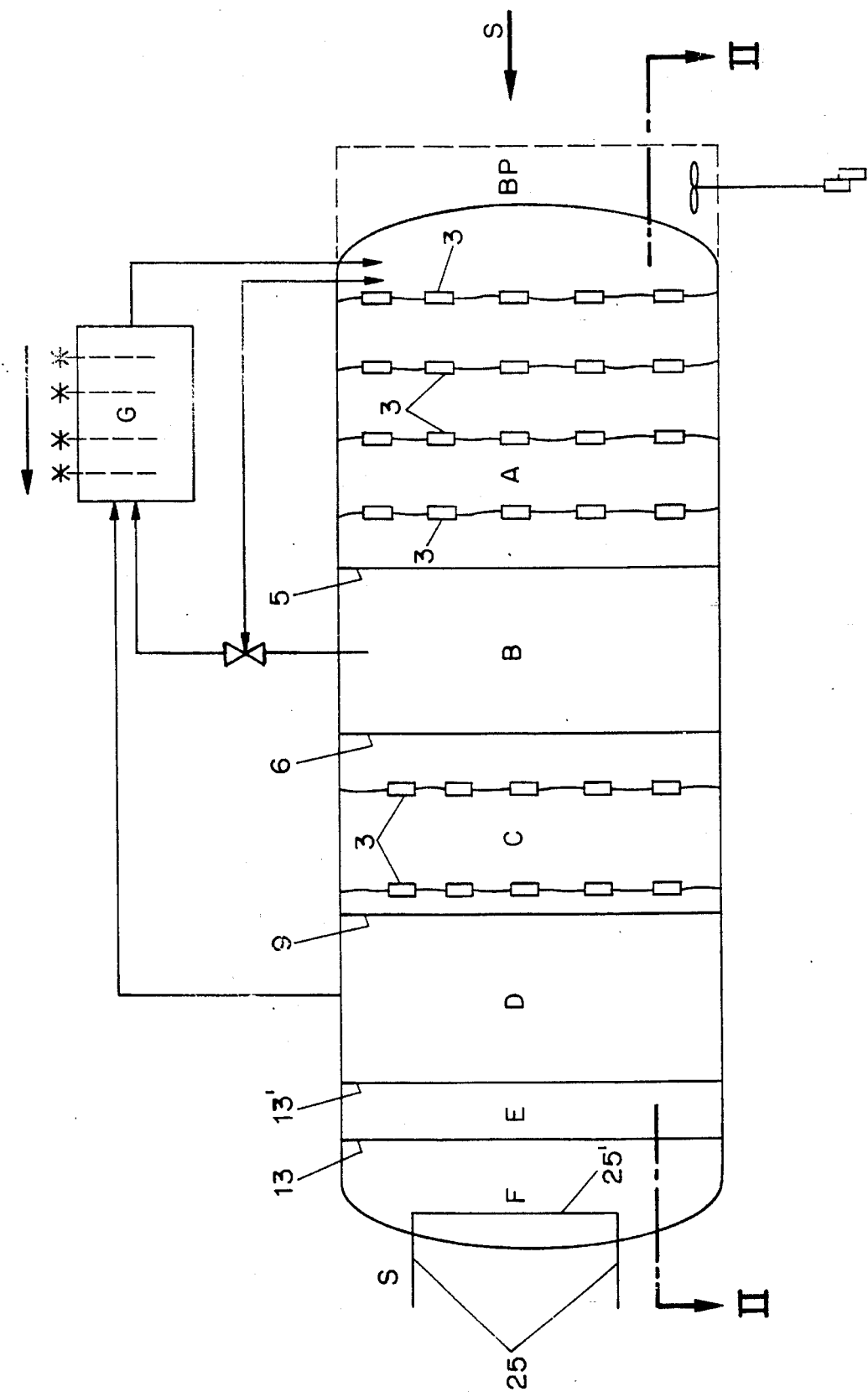
FIG. 1 is a schematic top view illustrating a representative arrangement for the biological purification of wastewater according to the invention.
Figure 2:
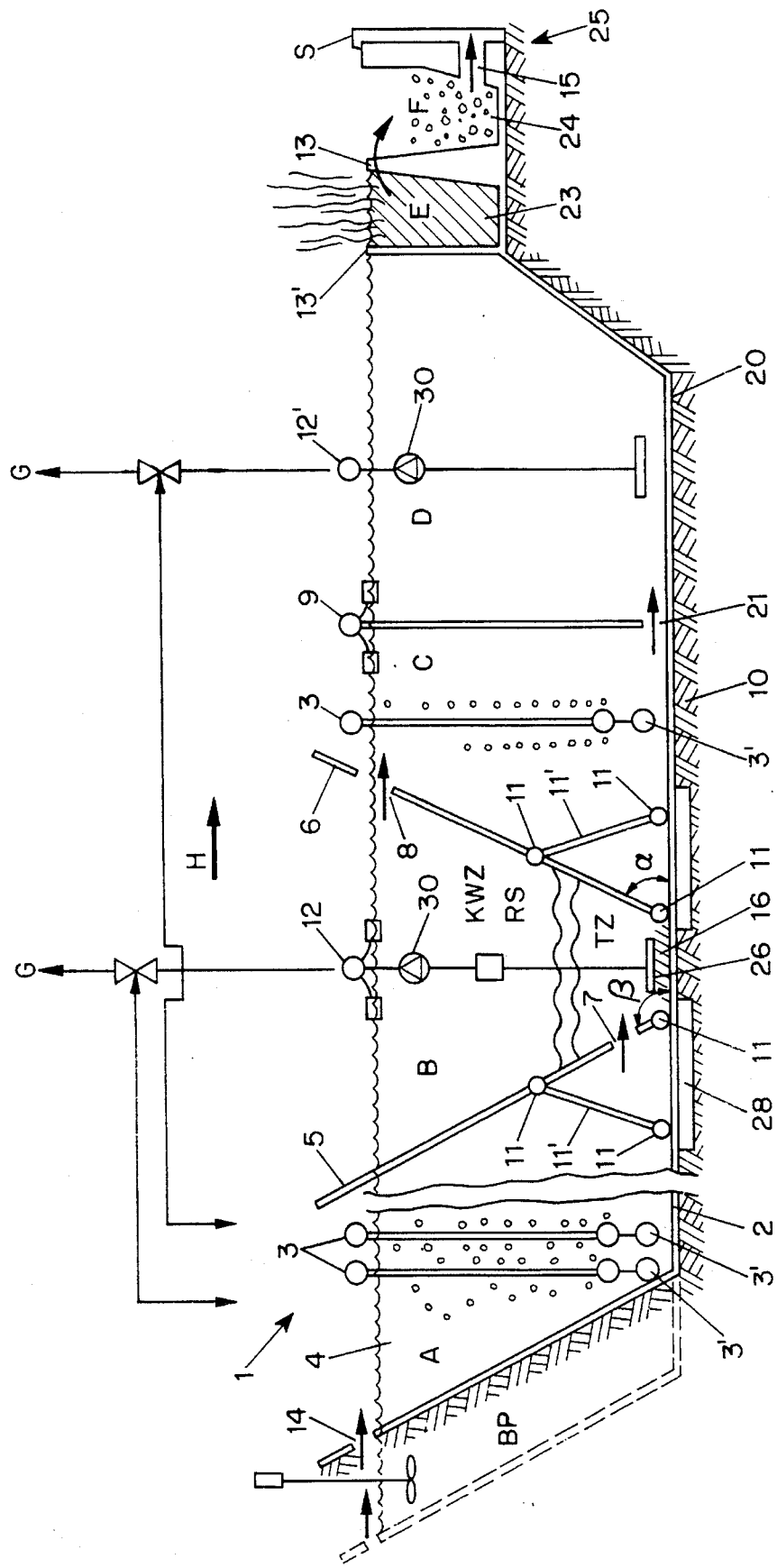
FIG. 2 is a schematic sectional illustration taken along the line II—II of FIG. 1 and looking in the direction of the arrows.

In the typical example shown schematically in FIGS. 1 and 2, the fundamental operating principle of the process and the apparatus for biological wastewater purification are illustrated.

In FIGS. 1 and 2, a basin 1 for the purification of wastewater together with an additional sludge-settling basin G are illustrated. The basin 1 is divided in the direction of current flow by a series of separating walls 5, 6, 9, 13, 13' and 14 into the following regions: a Bio-P (biological phosphorus) basin BP, an activated sludge region A, an intermediate clarification region B, a post-clarification aeration region C, a post-clarification sedimentation region D, and plant filter and polishing filter regions E and F, respectively. Depending on the overall design of the basin 1, one of the regions D, E and F may have a floating overflow S with a rigidly mounted outflow pipe 25 and a floating outflow pipe 25' through which the purified water is withdrawn. In the regions A and C, there are aeration devices such as, for example, aeration chains, each having a series of floats 3 and suspended diffusers 3', as shown in FIG. 2.

In the representative embodiment shown in the drawings, the basin 1 has a rectangular shape and the basin length may generally be between 50 m and 200 m, while the basin width can range between 20 m and 100 m. The basin depth is preferably about 3 m to 6 m. Naturally, however, other basin shapes and dimensions are also possible, for instance, in the regions C and D, a rectangular or even a 180° return-bend continuation of the basin can be provided. The width of the individual zones can vary and the bottom of the regions E and F, for example, may be higher than the rest of the basin.

The basin can be constructed as an earth basin by excavating an appropriate basin form. The bottom 20 of the basin and inclined side and end walls are covered with single- or multi-layer sealing webs 2, as seen in FIG. 2. At the inlet end with respect to the flow direction, inlet devices 14 are provided in the end wall of the basin. In the activated sludge region A, which by itself constitutes a major part of the basin length, flexible chains extending across the basin are supported at the surface by floats 3 and aeration diffusers 3' are suspended from the chains at locations close to the bottom. These devices introduce air and/or oxygen across the main part of the basin 1 up to the separating wall 5 and also cause circulation of the wastewater 4, as well as the sludge in the region A.

This type of aeration is described in German Patent No. 28 57 345, which issued to the present applicant, and, for further details, reference should be made to that patent. In FIG. 2, only two aeration chains with diffusers 3' are shown schematically. However, because the aeration chains move back and forth on the surface of the basin, the aeration devices are effective throughout substantially the entire region up to the separating wall 5.

The activated sludge region A is separated from the intermediate clarification region B by the separating wall 5, which is inclined upwardly at an angle β. The inclination of this separating wall can be changed by appropriate positioning of supporting legs 11' mounted on adjustable joints 11. The lower part of the separating wall 5 includes outlet openings 7 at a region close to the basin bottom 20 to direct the wastewater out of the activated sludge region A into the intermediate clarification region B. The intermediate clarification region B ends in a separating wall 6, which is inclined upwardly at a slope angle α. The separating wall 6 is also supported by supporting legs 11 mounted on adjustable joints 11'. The separating wall 6 has at least one outlet opening 8 in its upper region with respect to the basin bottom to allow wastewater to flow out of the intermediate clarification region into the post-clarification region. The outlet opening 8 is located in the region of the clear-water zone KWZ and lies generally beneath the water surface.

The intermediate clarification zone B, which is defined by the two separating walls 5 and 6, includes a horizontal sedimentation surface 26 on which the sludge 16 can be deposited and thickened before being removed and transported to the sludge-settling and storage basin G or returned to the activated sludge region A.

In the zone B, one or more sludge-removal suction devices 12 are arranged to travel crosswise with respect to the basin to remove the sludge 16. Naturally, as an alternative to this solution, a bottom sludge channel containing a suction device is also possible. In this case, the horizontal bottom of the regions B and/or D can be located below the bottom of the overall basin and can also have a funnel-like shape.

The post-clarification aeration region C includes further aeration diffusers 3' suspended from flexible aeration chains which are supported by floats 3 and move back and forth and by which air or oxygen is injected and a stirring action is provided. The post-clarification aeration region C is separated from the post-clarification sedimentation region D by a submerged wall 9 which has passage openings 21 in its lower portion through which the wastewater can flow out of the region C into the region D. If desired, the wall 9 can be designed to be inclined in the same manner as the walls 5 and 6. In the post-clarification sedimentation region, which has a horizontal sludge-deposition surface, a second sludge remover 12' is provided. After the post-clarification sedimentation region, the waste water flows through a plant filter E, which is separated by a separating wall 13' from the region D, and a polishing filter F, which is separated from the plant filter E by a separating wall 13. Both the plant filter E and the polishing filter F have a higher bottom surface than the rest of the basin.

In addition, a mechanical recirculating region (not shown) can be provided ahead of the region A by including another wall similar to the walls 5 and 9.

The volumes of each of the individual regions described above can be varied by appropriate modifications in the positions and orientations of the separating walls 5, 6 and 9.

The illustrated embodiment of the invention includes reinforcements 28 underneath the separating walls 5 and 6 to facilitate shifting and positioning of those walls on the bottom of the basin.

The arrangement according to the invention functions in the manner described hereinafter.

Wastewater 4 to be clarified is introduced into the activated sludge region A of the basin 1 through an intake 14 or into the basin BP. In the activated sludge region A, the activated sludge process is carried out. In the Bio-P region BP, the biological P (phosphorus) elimination process is carried out. By moving back and forth, the aerator chains, supported by floats 3, maintain the entire volume of the activated sludge region A, with all its suspended matter, in a mixing and circulating condition and, at the same time, the diffusers 3' aerate the entire volume of the activated sludge region with fine bubbles. The amount of air introduced is automatically controlled in accordance with the basic load and the adjusted oxygen need, or it can be controlled semiautomatically by adjusting timing control devices in a manner such that the minimum amount of air required for mixing the activated sludge is always provided. In this region, the aerobic decomposition process of the pollution components is carried out.

Because the wastewater is introduced and drawn off at opposite ends of the basin, a current is produced through the basin from the intake 14 to the outlet 15. In this fashion, the wastewater, together with the activated sludge which is suspended in it and is continuously circulated by the introduction of air, slowly progresses through the region A in the direction of the separating wall 5 where, as a result of the large throughflow area, the wastewater is delivered in a quiescent state so that it flows quietly and slowly through the large area inlet passage holes 7. The sludge is then caused to deposit and thicken on the horizontal bottom surface 26 of the region B, which is confined to the necessary extent by the orientation of the separating walls 5 and 6. The water passes through a separating zone designated TZ by flowing in an upwardly-inclined direction which is almost vertical and substantially above the deposition surface. Above this separating zone, a filtration-aiding layer RS is formed which is made up of fine suspended particles having a settling velocity which is about equal to the upward velocity of the water flow. In this layer, particles that do not deposit or deposit only slowly are captured and are then definitively separated from the water by sinking as clumps. The outlet opening 8 from the region B is located in the clear-water zone above this filtration-aiding layer RS and generally below the surface of the water. On the large horizontal sedimentation surface 26, which can have a length of 4 m or more and which as a rule extends across the entire basin width, a surface thickening occurs in a "thin layer", i.e., the deposited activated sludge particles are distributed in a thin layer rather than in a more-or-less V-shaped channel which could lead to the danger that the sludge may die off and duckweed may develop. At this point, the well-known advantages and mechanism of thin layers in separation and thickening processes are obtained. Inasmuch as the sedimentation zone consists of vertical and horizontal current components, it could be said that in this type of surface-clarification, there occurs a desirable joint action of horizontal and vertical clarification, thereby combining the advantages of both horizontal and vertical clarifiers. After a sufficient amount of activated sludge has deposited on the bottom surface 26, the sludge is removed by a suction pick-up 12 which moves back and forth over the bottom surface generally in a direction that is normal to the main current direction. As illustrated, the pick-up 12 can be operated from the water surface, being suspended there in a floating manner and carrying a suction pump with it. The pick-up conveys the sludge to the return or to a sludge-settling and storage basin.

The wastewater 4, which has been largely purified in this manner, flows out through the overflow device 8 of the separating wall 6 into the post-clarification aeration region C, where the wastewater is again recirculated by moving chain aerators with suspended aeration devices 3', and, most importantly, is supplied with oxygen in order to decompose remaining suspended particles and to wholly or partially saturate the water with oxygen.

The aeration region C is separated from the sedimentation region D by a submerged wall 9 having openings 21 through which the wastewater flows into the sedimentation region. In this sedimentation region, any sludge particles that have been carried along by the wastewater or that overflowed into the outlet 8 because of process disturbances in the region A deposit on the bottom surface 20 and can then be removed by one or more sludge-removal devices 12'.

Thereafter, the purified wastewater is filtered by means of a plant root filter E and a polishing filter F. The wastewater that has been purified in this manner is removed through the float overflow S and through the outlet pipes 25, as described, for example, in German Offenlegungsschrift No. 32 41 595. The flow rate of the float overflow can be adjusted, which makes it possible to produce a regulated outflow and a buffering which are independent of the intake.

By providing a pump 30 in the sludge-removal devices 12 and 12', sludge from the regions B and D can be pumped into the sludge-settling basin G or else back into the region A. Naturally, the pumps 30 may also be located at another position in the sludge-removal and return system.

Of course, this invention is not limited to the representative embodiment described above. The invention makes it possible to divide the basin 1 into any desired number of clarification regions $A-A_n$ in any desired sequence and to expand the capacity of the installation, either by increasing the size of the activated sludge region A and/or of the individual regions, or by operating several basins in parallel. Of particular advantage is the fact that the design allows an adjustment to lower initial loads or a varying response to differing hydraulic or biochemical loads. It is also possible to directly connect, after the region D, E or F, storage basins of any desired size for the largely purified water for subsequent utilization. Thus, all such variations and modifications which will occur to those skilled in the art are included within the intended scope of the invention.

We claim:

1. A process for the biological treatment and purification of wastewater by passing it through successive regions in the same basin which are separated by walls comprising aerating the wastewater in a first aeration region of the basin, passing the aerated wastewater through an opening in a lower portion of a separating wall to an intermediate clarification region of the basin, subjecting the wastewater to intermediate clarification in the intermediate clarification region of the basin, collecting sludge on a sedimentation surface of the intermediate clarification region, removing sludge from the sedimentation surface of the intermediate clarification region, passing the clarified wastewater through an opening in another separating wall into a second aeration region of the basin, aerating the wastewater after intermediate clarification a second time in the second aeration region of the same basin, passing the aerated wastewater through another wall into a sedimentation region, and carrying out sedimentation in the sedimentation region of the same basin.

2. A process according to claim 1 wherein, during the first aeration step, wastewater is introduced into an activated sludge region of the basin and is aerated and circulated therein so that an aerobic decomposition process takes place.

3. A process according to claim 1 wherein the wastewater flows into an activated sludge region of the basin for the first aeration step and flows from the activated sludge region into the intermediate clarification region through at least one outlet opening which is located in a lower part of a first separating wall with respect to the basin bottom, whereby activated sludge is deposited on the sedimentation surface in the intermediate clarification region, and removing sludge from the intermediate clarification region by a sludge remover.

4. A process according to claim 1 wherein the wastewater flows from the second aeration region through a lower part of a further separating wall into the sedimentation region where sludge is deposited and then removed by a sludge remover.

5. A process according to claim 1 wherein the wastewater flows from the sedimentation region through a plant filter and a polishing filter and thereafter flows out of the basin in purified form.

6. A process for the biological treatment and purification of wastewater in successive stages in the same basin comprising aerating the wastewater in one region of the basin, subjecting the wastewater to intermediate clarification in another region of the basin, removing sludge from the intermediate clarification region, aerating the wastewater after intermediate clarification a second time in a further region of the same basin, and carrying out a sedimentation stage in still another region of the same basin, wherein the volumes of the various regions of the basin are variable and are adjusted to the inlet load and to the purification process by appropriate positioning of movable walls separating the regions.

7. Apparatus for the purification of wastewater comprising a basin having a plurality of regions, including the following regions arranged in the following sequence in the direction of current flow: an activated sludge region, an intermediate clarification region having a sedimentation surface and having a sludge-removal device for removing sludge from the sedimentation surface, a post-clarification aeration region, and a post-clarification sedimentation region, and a plurality of walls dividing the basin into the plurality of regions and provided with passages to convey the wastewater from one region to another region, the passage from the activated sludge region to the intermediate clarification region being in a lower portion of the wall therebetween.

8. Apparatus according to claim 7 wherein the basin is a reinforced earth basin.

9. Apparatus according to claim 7 wherein the bottom and side walls of the basin are covered with sealing webs.

10. Apparatus according to claim 9 wherein the sealing webs comprise thin films of impermeable material.

11. Apparatus according to claim 7 including a filter region at the outlet end of the basin having a higher bottom level than the bottom level of the other regions of the basin.

12. Apparatus according to claim 11 wherein the filter region includes a plant filter and a polishing filter which are separated from each other by a separating wall.

13. Apparatus according to claim 12 wherein the separating wall distributes the flow of water from the plant filter to the polishing filter across the width of the filter region.

14. Apparatus according to claim 7 including a filter region at the outlet end of the basin and located in the same basin as the post-clarification aeration region and the post-clarification sedimentation region and wherein the activated sludge region and the intermediate clarification region each include a plurality of parallel flowpaths for the wastewater.

15. Apparatus according to claim 7 including a separating wall which separates the intermediate clarification region from the post-clarification aeration region and which is inclined from the vertical.

16. Apparatus according to claim 15 wherein the separating wall separating the intermediate clarification region and the post-clarification aeration region has a passage at its upper end permitting flow of wastewater out of the intermediate clarification region and into the post-clarification aeration region.

17. Apparatus according to claims 7 wherein the activated sludge region terminates in a separating wall which is inclined from the vertical.

18. Apparatus according to claim 7 wherein the outlet opening is no more than about 30% of the submerged separating wall height above the bottom of the basin.

19. Apparatus according to claim 7 including a separating wall which separates the post-clarification aeration region from the post-clarification sedimentation region having at least one flowthrough opening in a lower region, 20. Apparatus according to claim 19 wherein the flowthrough opening is no more than about 30% of the submerged separating wall height above the bottom of the basin, 21. Apparatus according to claim 7 wherein at least one of the walls is a submerged wall.

22. Apparatus according to claim 7 wherein the slope of at least one of the walls can be adjusted by means of joints.

23. Apparatus according to claim 7 wherein at least one of the walls is supported in fixed position within the basin.

24. Apparatus according to claim 7 wherein the intermediate clarification region and the post-clarification sedimentation region have horizontal deposition surfaces.

25. Apparatus according to claim 7 wherein at least one of the intermediate clarification region and the post-clarification sedimentation region have a sludge deposition surface which is below the basin bottom.

26. Apparatus according to claim 7 including a sludge channel formed in the intermediate clarification region.

27. Apparatus according to claim 7 including a further basin arranged parallel to the first-mentioned basin.

28. Apparatus according to claim 7 including a float overflow at the outlet end of the basin.

29. Apparatus according to claim 7 including at least one sludge-settling basin.

30. Apparatus according to claim 7 including a biological phosphorus processing region located ahead of the activated sludge region with respect to the direction of flow of wastewater.

31. Apparatus for the purification of wastewater comprising a basin having a plurality of regions, including the following regions arranged in the following sequence in the direction of current flow: an activated sludge region, an intermediate clarification region, a post-clarification aeration region, and a post-clarification sedimentation region, and a plurality of walls dividing the basin into the plurality of regions and provided with passages to convey the wastewater from one region to another region, wherein the walls are movably mounted in the basin to permit changes in the volumes of the various regions.

32. A process for the biological treatment and purification of wastewater in successive stages in a plurality of regions in the same basin comprising aerating the wastewater in one region of the basin, subjecting the wastewater to clarification in another region of the basin, and removing sludge from the clarification region, wherein the volumes of the various regions of the basin are variable and are adjusted to the inlet load and to the purification process by appropriate positioning of movable walls separating the regions.

33. Apparatus for the purification of wastewater comprising a basin having a plurality of regions, including the following regions arranged in the following sequence in the direction of current flow: an activated sludge region and a clarification region, and a plurality of walls dividing the basin into the plurality of regions and provided with passages to convey the wastewater from one region to another region, wherein the walls are movably mounted in the basin to permit changes in the volumes of the various regions.

* * * * *